United States Patent [19]

Dibernardi

[11] 4,429,497

[45] Feb. 7, 1984

[54] PIPE SUPPORT SYSTEM

[76] Inventor: Peter A. Dibernardi, 1 Cindy Dr., St. James, N.Y. 11780

[21] Appl. No.: 252,875

[22] Filed: Apr. 10, 1981

[51] Int. Cl.³ .............................................. E04F 19/00
[52] U.S. Cl. .......................................... 52/27; 52/294; 248/73; 248/74 R
[58] Field of Search .................... 52/27, 294, 295, 296, 52/DIG. 11; 248/65, 74 R, 539, 538, 536, 679, 66, 73, 49, 71; 403/356, 359, 312

[56] References Cited

U.S. PATENT DOCUMENTS

| | | | |
|---|---|---|---|
| 1,914,918 | 6/1933 | Heermans | 52/221 X |
| 2,002,103 | 5/1935 | Wheeler | 248/49 |
| 3,630,474 | 12/1971 | Minor | 52/296 X |
| 3,802,676 | 4/1974 | Thayer | 248/74.1 X |
| 4,125,975 | 11/1978 | Soble | 52/DIG. 11 X |

Primary Examiner—Carl D. Friedman
Attorney, Agent, or Firm—Morgan, Finnegan, Pine, Foley & Lee

[57] ABSTRACT

A support system for preventing the movement of pipes relative to a structural element, such as a wall, is disclosed. More specifically, a unique clamp is disclosed having a locking configuration located on the inner surface thereof. The locking configuration includes axial and circumferential engaging splines. The pipe to be supported is provided with a complementary locking configuration including axial and circumferential recessed keys. The pipe is receivable within the clamp such that the complementary keys and splines are aligned and interlocked thereby inhibiting movement of the pipe. The subject invention further includes a plurality of novel components for connecting the pipe to a structural element.

21 Claims, 2 Drawing Figures

PIPE SUPPORT SYSTEM

BACKGROUND OF THE INVENTION

In a variety of industrial applications such as nuclear generating plants and oil refineries, liquid and gaseous materials must be transported throughout the installation. Typically, large networks of conduits or pipes are provided for channeling materials to different parts of the installation. Consequently, during construction, substantial amounts of time and money are expended to erect a system of pipes and complementary pipe supports necessary to enable the plant to function.

In industries such as nuclear power generation, federal and authorized governing agencies set forth regulations that are stringent with regard to design criteria, erection and inspection of weld joints. Thus, in a typical construction sequence, a plant is designed to include the location and arrangement of the network of pipes and pipe supports. These designs can then be reviewed by regulators for approval. Once approval has been granted, the plant is built and the network of pipes and pipe supports are installed. Usually segments of pipe supports are measured, cut to size and custom fitted. The erection of the pipe system includes the welding of supporting members between the walls and the pipes. The use of welding as a connection means is selected because it provides a high degree of stability and limits the shifting of the pipes relative to the wall structures. These criteris are of particular importance in the design of nuclear power generators wherein lines must be totally restrained from dynamic and thermal loads and further protected from damage due to, for example, earthquakes.

The prior art system of construction, however, has various shortcomings. Primarily, the erection and joint preparation necessary for welding of pipe support members directly to pipes is time consuming and expensive. Further, every weld joint to a pipe in a nuclear plant is subjected to rigid standard of joint qualifications along with intense federal and governing authority scrutiny, and therefore requires various highly technical personnel in documentation for qualifying said welds, for joint preparation, as well as the requirement for appropriately qualified welders. Further monitored is effected by authorized regulatory inspectors, in conjunction with stringent quality control and assurances. Another problem associated with prior art construction techniques is that frequently, as a result of modified criteria and inspections, various alterations and modifications are required to be made to the pipe support system. Therefore, the welded pipe support must be modified or taken down, and additional or new support members installed, as prescribed by the change specifications. As can be appreciated, the breakdown and rewelding of pipe supports adds significant expense to the construction cost. Furthermore, there is the possibility of damage to the pipe upon removal of members along with the repeated heating of pipes which occurs during a welding operation, and which could reduce the structural integrity of the pipes.

Accordingly, it is an object of the subject invention to provide a new and improved pipe support system for securing pipes to a structural element such as a wall to prevent the movement of the pipes relative to the structural element.

It is another object of the subject invention to provide a new and improved pipe support system including cooperating, interlocked engaging means which prevents pipes from shifting axially, radially, and all directions relative to a structural element such as a wall.

It is a further object of the subject invention to provide a new and improved pipe support system which includes novel components which substantially reduce and eliminate the need of welding directly to pipes.

It is still another object of the subject invention to provide an improved pipe support system which will eliminate the cumbersome documentation package required by governing authorities accompanying welds of a pipe support system.

It is still another object of the subject invention to provide a new and improved pipe support system eliminating those welds requiring intricate joint qualifications.

It is another object of the subject invention to provide a new and improved pipe support system eliminating the monitoring and qualifying of said welds by authorized inspectors.

It is still another object of the subject invention to provide a new and improved pipe support system having novel components which can be initially erected using bolts such that initial installation can be readily carried out without welding.

It is still a further object of the subject invention to provide a new and improved pipe support system wherein the structural integrity of the pipes are maintained since repeated welding is substantially eliminated.

It is still another object of the subject invention to provide a new and improved pipe support system which includes novel components that can be standardized such that custom fitting of the installation is unnecessary.

SUMMARY OF THE INVENTION

In accordance with these and other objects, the subject invention provides for a support system for preventing the movement of pipes relative to a structural element such as a wall. More specifically, a portion of the outer surface of a cylindrical pipe is provided with a locking configuration. The locking configuration includes at least one axial engaging means and at least one circumferential engaging means. The engaging means can consist of for example, upstanding splines, serrations, or alternatively, recessed keys.

The subject invention further includes a clamp which is generally cylindrical in configuration having an inside diameter corresponding to the outside diameter of the pipe. The inside surface of the clamp is provided with a complimentary locking configuration which also includes at least one axial and one circumferential engaging means. The pipe is receivable within the clamp in such a manner that each pair of complimentary axial engaging means are aligned and interlocked, and each pair of complimentary circumferential engaging means are aligned and interlocked. The interlocking between the complimentary engaging means functions to prevent the pipe from shifting axially or radially relative to the clamp.

A means for rigidly connecting the clamp to a structural element such as a wall is provided and includes a group of novel components, that can be standardized and which may be initially bolted together to erect a pipe support system. By this arrangement, there is no need to use the customized construction techniques of the prior art. Further, the pipe support system can be erected without the use of qualified nuclear welders. If changes in design should be required, the system may be readily broken down and reassembled since bolting is initially utilized instead of welding.

The connecting means includes an embedment plate which is preferably mounted to the wall during the latter's initial construction. A surface plate can then be readily mounted to the embedment plate at any desirable height. The surface plate is connected to the clamp via an extension member. If the pipe is to be subjected to heavy loads, or if maximum protection is desired, an adapter member may be interconnected between the extension member and the clamp. The adapter member facilitates the addition of multiple extender members, connected to separate surface and embedment plates. The number of extension members which are used is a function of the amount of strength desired. Once the structure has been assembled and the design has been approved, certain parts may be welded to provide additional strength.

DESCRIPTION OF THE PREFERRED EMBODIMENTS

Figure 1:
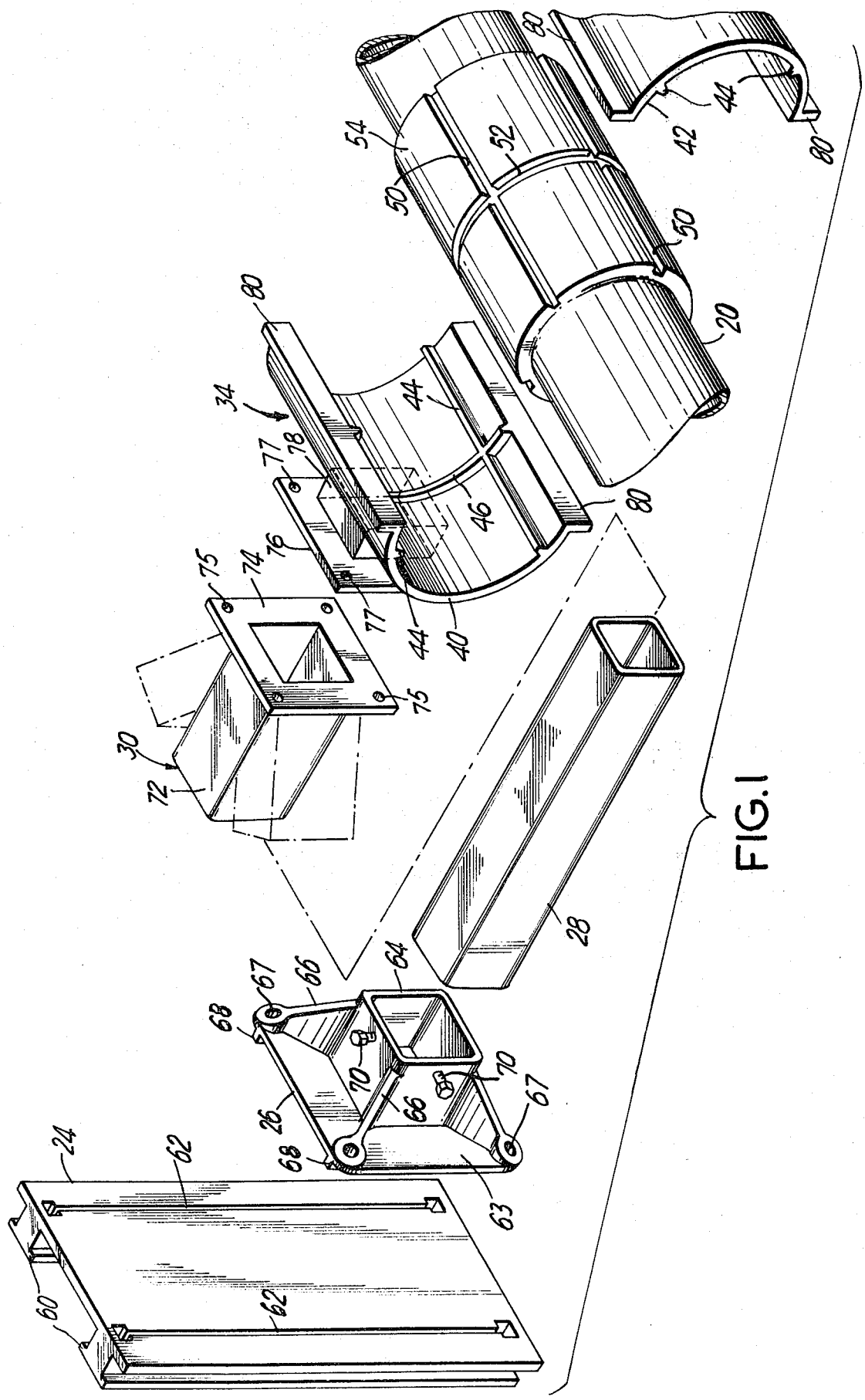
FIG. 1 is an exploded perspective view, illustrating the component parts of the new and improved pipe support system of the subject invention.
Figure 2:
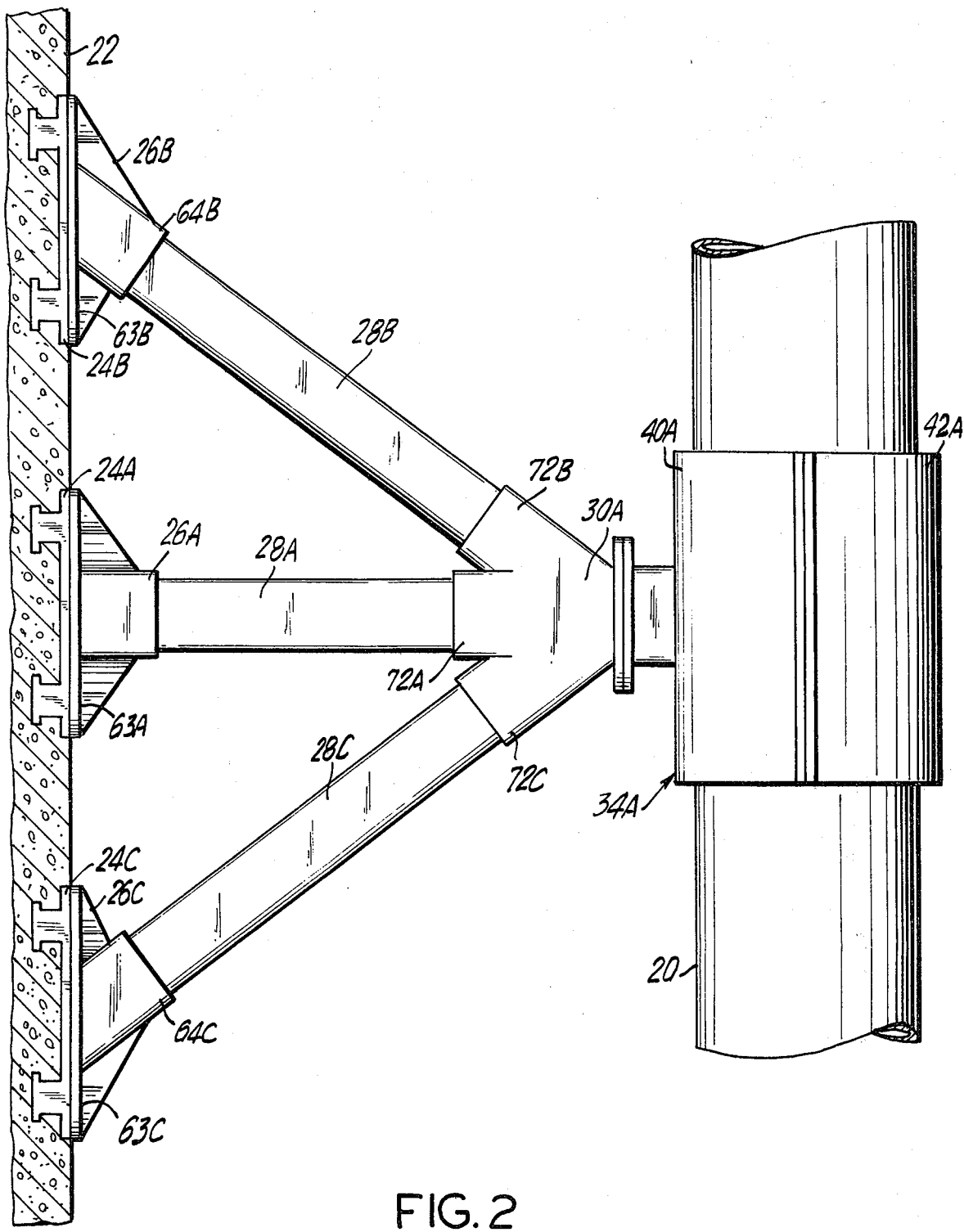
FIG. 2 is a top plan view of the pipe support system of the subject invention illustrating a multiple strut application.

Referring to FIGS. 1 and 2, there is illustrated the new and improved pipe support system of the subject invention. The subject system is intended to provide support for pipes 20 and prevent their movement relative to a structural element such as a wall 22. The novel components of the system may be readily assembled by bolting prior to approval, and thereafter may be welded if desired. Further, the novel components of the subject invention can be standardized and stocked in quantity such that custom assembly is not required. The support components include an embedment plate 24, which is intended to be mounted to wall 22 and preferably incorporated within the wall structure during the initial building of the facility. However, if additional supporting members are to be required after wall 22 is constructed, a wall mounted plate can be installed with approved hardware to one familiar with the state of the art. A surface plate 26 is mounted to the embedment plate with an extension member 28 being receivable therein. An adapter 30 is provided, to interconnect the extension member to a clamp 34. Adapter 30 may be provided with one or more female extension flanges, depending on load requirements, as more fully discussed hereinafter. Further, adapter 30 and clamp 34 are connected by bolting.

Clamp 34 is generally cylindrical in configuration and includes two generally semi-cylindrical halves 40 and 42. Each clamp segment 40, 42 includes a locking configuration on the inner surface thereof. In the illustrated embodiment, the locking configuration includes a plurality of axial splines 44 and a circumferential spline 46. The splines 44 and 46 cooperate with complimentary configurations on pipe 20 to prevent the axial and radial movement of the pipe relative to the clamp.

Pipe 20 can be part of a network of pipes for channeling materials throughout a facility. Preferably, the pipe is supported at intervals along its length. In accordance with the subject invention, portions of the outer surface of the pipe will include a locking configuration having a complimentary engaging means. In the illustrated example, the locking configuration includes a plurality of axial recessed keys 50 and a circumferential recessed key 52. Keys 50 and 52 are placed in an area 54, of the pipe, having increased wall thickness. Preferably, the increased wall thickness area 54 is provided such that the structural integrity of the pipe is not diminished when the keys are machined.

It is to be understood that the number and arrangement of the splines and keys forming the engagement means of the subject invention can be varied according to load requirements. Further, it is to be understood that various other configurations including, for example, serrations could be similarly utilized. In addition, while FIG. 1 illustrates a pipe 20 having recessed keys 50, 52 and the clamp 34 having upstanding splines, 44, 46 it will be readily apparent to one skilled in the art, that other combinations are possible, such as providing the pipe with splines while the clamp is provided with recessed keys. It is a requirement of the subject invention, that the matched pairs be complimentary and interlocking in configuration. It is also preferable that both axial and circumferential engaging means be provided. However, if design criteria requires additional supports to be installed after said wall 22 is constructed, a plate may be used and secured to wall 22 with approved hardware by one familiar with the art.

Having briefly described the novel components of the subject invention, their detailed configuration and methods of connection will now be disclosed. As discussed above, it is desirable that embedment plate 24 be mounted to a wall 22 during the formation of the wall. Accordingly, embedment plate 24, which is essentially planar in configuration, is provided with elongated rail member 60, on the rear surface thereof. The rail members are provided to form a secure bond with the wall 22 as illustrated in FIG. 2. The front surface of embedment plate 24 is provided with a pair of longitudinally extending T-slots 62. T-slots 62 are provided to facilitate mounting of surface plate 26 utilizing T-bolts.

Surface plate 26 includes a generally planar plate portion 63 having a central female rectangular flange 64 projecting therefrom. Flange 64 is adapted to receive extension member 28. A plurality of gussets or ribs 66 may be provided interconnecting the flange 64 and the planar plate 63 to increase the structural rigidity of the flange. Preferably, bolt holes 67 are provided in the four corners (or more as required) of the plate 26. The rear surface of plate 63 is provided with rails 68 which are receivable in the T-slots 62 of the embedment plate 24. Accordingly, when the surface plate 26 is mounted, it is placed in abutting relationship with embedment plate 24, such that ribs 68 act as guides within slots 62. The height of the plate is adjusted by sliding the ribs 68 within the slots 62. Prior to placing surface plate 26, T-bolts are installed through the access slots and are connected through bolt holes 67. Therefore depending upon requirements, plate 63 may be welded to plate 24 at acceptance of pipe support erection.

Extension member 28, which is an elongated, generally rectangular tube, is readily receivable in female flange 64 of surface plate 26. Preferably, the end of extension member 28, which is received in flange 64 (whose length will provide for maximum adjustment of extension member 28 to facilitate construction tolerance) is in abutting relationship with plate 24. Extension member 28 is secured with in female flange 64 by tightening bolts 70. However, flange 64 may be welded to extension piece 28 depending on requirements and final acceptance of pipe support erection.

Adapter 30 is mounted on the opposed free end of extension member 28. Adapter 30 includes a female extension 72, flanged at 74 that is configured to receive extension member 28, then secured with bolts 70. However, flange 72 may be welded to extension piece 28 depending upon requirements and at final approval of erection of pipe support system. Additional flanges (shown in phantom) may be desirable if either a heavy load on the pipe is anticipated or the length of extension member 28 creates a cantilever effect that necessitates additional support. The additional flanges are connectable to additional extension members and embedment plates, as illustrated in FIG. 2, and as discussed more fully hereinbelow.

Clamp segment 40 includes a bolting plate 76 substantially conforming to the configuration of bolting plate 74 on adapter 30. Preferably, the adapter and clamp are interconnected by bolting the plate 74 and 76 directly together through bolt holes 75, 77, respectively. By this arrangement, extension member 28 can pass through the entire length of the adapter 30 and project into a female receptacle segment 78, located between plate 76 and the outer surface of clamp segment 40 thereby providing additional support.

Pipe 20 is mounted within clamp sections 40 and 42 in a manner such that the complimentary pairs of engaging means are aligned and interlocked. More specifically, axial splines 44 are interlocked with axial recessed keys 50, while circumferential spline 46 is interlocked with circumferential key 52. Preferably, when the support system is initially erected, clamp segments 40 and 42 are bolted together through holes. Depending upon requirements, flanges 80 of the clamp segments 40, 42 may be welded together in addition to bolting to insure that the cooperating complimentary engaging means remain interlocked.

The interlocking engaging means of the subject invention prevent the pipe 20 from shifting relative to the clamp 34. More specifically, the interlocked axial engaging means prevent the pipe from rotating radially relative to the clamp. Similarly, the circumferential engaging means prevent the pipe from shifting axially relative to the clamp. This type of positive locking of the pipes is particularly desirable in critical applications such as nuclear power plants where pipe movement could cause cracks, ultimately resulting in the release of dangerous radioactive materials.

The pipe and clamp combination is spatially oriented relative to the wall 22 by the remainder of the novel components. FIG. 2 illustrates a typical installation wherein a plurality of standardized components can be used to rapidly construct a secure system. More specifically, in FIG. 2, three embedment plates 24A, 24B, and 24C are illustrated, formed in wall 22. The central surface plate 26A, as well as the central extension member 28A correspond to the configuration substantially as described and illustrated in FIG. 1. In contrast, each remaining surface plate (26B, 26C) has a female extension flange (64B, 64C) which projects outwardly from the associated plate (63B, 63C) at various angles. As can be appreciated, plates 64B and 64C are identical in construction and have merely been rotated 180° relative to each other. It is envisioned that a plurality of standardized components be supplied to satisfy most installation requirements. A typical installation will facilitate components with surface plates having extensions projecting at angles complimentary to adapter flange 72B and 72C.

Extension members 28A, 28B and 28C, which are mounted in surface plates 26A, 26B and 26C respectively, are all received in adapter 30A. Adapter 30A is provided with three female extension flanges 72A, 72B, and 72C. Side extension flanges 72B and 72C are disposed at corresponding angles to 64B and 64C relative to the central flange 72A.

By providing a three-way support, the structural rigidity of the system is greatly enhanced. However, if greater support is desired, additional flanges extending, for example out of the top and bottom of the adapter, may be provided.

Adapter 30A is connected directly to clamp section 40A. Clamp sections 40A and 42A are mounted around pipe 20. As discussed above, the complimentary pairs of engaging means of the subject invention prevent the pipe from shifting axially and radially relative to the clamp. The remaining novel structural components prevent any shifting of the pipe relative to the wall 22.

Accordingly, there has been provided a new and improved pipe support system for securing pipes to a structural element such as a wall. The subject support system includes a cylindrical pipe 20 wherein a portion of the outer surface thereof includes a locking configuration. The locking configuration includes at least one axial and one circumferential engaging means. A cylindrical clamp 34 is provided, with the inside diameter thereof substantially conforming to the outside diameter of the pipe. The inside surface of the clamp includes a complimentary locking configuration having at least one axial and one circumferential engaging means. In accordance with the subject invention, the pipe is receivable within the clamp such that each pair of complimentary axial engaging means are aligned and interlocked, and each pair of complimentary circumferential engaging means are aligned and interlocked. By this arrangement, shifting of the pipe in the axial and radial directions is inhibited relative to clamp.

The subject invention further provides for a new and improved means for connecting the clamp to the structural element. The connecting means includes an embedment plate 24 which is preferably formed integrally with the structural element. A surface plate 26 is provided which is connectable to the embedment plate. An adapter 30 is connected to the clamp, and an extension member interconnects the surface plate to the adapter. It is intended that the novel components, connecting the clamp to the structural element, be standardized such that customized assembly is not necessary, thereby eliminating those welds that require qualifying documentation, complex joint preparation and regulatory inspections. In addition, the system can be readily erected without welding, prior to final approval, such that changes can be easly made. Construction costs are substantially reduced along wtih enhancing the safeguard of the pipe by eliminating repeated weldings, which could reduce the structural integrity of the pipes. The composite system is effective for preventing any relative movement between the structural element and the pipe.

It is to be understood that while the subject invention has been described with reference to preferred embodiments it is apparent that other changes and modifications could be made therein by one skilled in the art without varying from the scope or spirit of the subject invention as defined by the appended claims.

I claim:

1. A pipe support for securing pipes to a structural element, such as a wall, to prevent the movement of the pipes relative to said structural element, said pipe support system comprising:
   a generally cylindrical pipe, with a portion of the outer surface of said pipe including at least one axial engaging means and at least one circumferential engaging means formed on said pipe outer surface portion;
   a generally cylindrical clamp, with the inside diameter of said clamp substantially corresponding to the outside diameter of said pipe and with the inner surface of said clamp including at least one complimentary axial engaging means and at least one complimentary circumferential engaging means formed on said clamp, said pipe being receivable within said clamp such that each said complimentary axial engaging means and axial engaging means are aligned and interlocked, and each said complimentary circumferential engaging means and circumferential engaging means are aligned and interlocked to prevent said pipe from shifting in both the axial and radial directions substantially without welding said clamp to said pipe; and
   means for rigidly connecting said clamp to said structural element whereby said pipe is supported and prevented from moving relative to said structural element.

2. A pipe support system as recited in claim 1 wherein said clamp comprises two semi-cylindrical sections secured together around said pipe.

3. A pipe support system as recited in claim 1 wherein said connecting means includes a planar, generally rectangular embedment plate which is affixed along one surface directly to said structural element and adapted to be coupled along its other surface to said clamp.

4. A pipe support system as recited in claim 3 wherein one surface of said embedment plate includes a pair of longitudinally extending rails adapted to be embedded into the thickness of said structural element for securing said embedment plate thereto.

5. A pipe support system as recited in claim 3 further including a generally planar surface plate, said surface plate being connected to said embedment plate.

6. A pipe support system as recited in claim 5 wherein one surface of said surface plate includes a pair of longitudinally extending, parallel rails, and wherein said other surface of said embedment plate includes a pair of longitudinally extending parallel slots, said rails of said surface plate being received in said slots to facilitate mounting.

7. A pipe support system as recited in claim 6 wherein the other surface of said surface plate includes a generally rectangular female extension flange.

8. A pipe support system as recited in claim 7 wherein said surface plate further includes a plurality of gusset members, said gusset members extending from said other surface of said surface plate to the sides of said female extension flange.

9. A pipe support system as recited in claim 7 wherein said connecting means further includes a longitudinally extending extension member, said extension member being receivable in said female extenion flange of said surface plate.

10. A pipe support system as recited in claim 9 wherein said connecting means further includes an adapter, said adapter being connected to said clamp and including a generally rectangular female extension flange, with the opposed free end of said extension member being receivable therein.

11. A pipe support system as recited in claim 10 wherein said adapter includes a plurality of extension flanges to permit multiple connections to said structural element.

12. A pipe support system as recited in claim 10 further including a planar bolter plate, said bolter plate being interconnected between said adapter and said clamp.

13. A pipe support system as recited in claim 1 wherein said connecting means comprises:
   a planar, generally rectangular embedment plate, said embedment plate being affixed directly to said structural element;
   a generally planar surface plate, said surface plate being connected to said embedment plate and including a generally rectangular female extension flange;
   a longitudinally extending, extension member, said extension member being receivable in said female extension flange of said surface plate; and
   an adapter, said adapter being connected to said clamp and including a generally rectangular female extension flange, with the opposed free end of said extension member being receivable therein.

14. A pipe support for securing pipes to a structural element, such as a wall, to prevent the movement of the pipes relative to said structural element, said pipe support system comprising:
   a cylindrical pipe, with a portion of the outer surface of said pipe including a locking configuration, said locking configuration including at least one axial engaging means and at least one circumferential engaging means;
   a cylindrical clamp, with the inside diameter of said clamp substantially corresponding to the outside diameter of said pipe and with the inner surface of said clamp including a complimentary locking configuration, said complimentary locking configuration including at least one axially engaging means and at least one circumferential engaging means, said pipe being receivable within said clamp such that each pair of complimentary axial engaging means are aligned and interlocked, and each pair of complimentary circumferential engaging means are aligned and interlocked thereby preventing said pipe from shifting in both the axial and radial directions relative to clamp, with each said complimentary pair of interlocking engaging means including an upstanding engaging means including an upstanding spline and a recessed key;
   means for rigidly connecting said clamp to said structural element, said means including,
   a planar, generally rectangular embedment plate, said embedment plate being affixed directly to said structural element;
   a generally planar surface plate, said surface plate being connected to said embedment plate and including a generally rectangular female extension flange;
   a longitudinally extending extension member, said extension member being receivable in said female extension flange of said surface plate; and
   an adapter, said adapter being connected to said clamp and including a generally rectangular female extension flange, with the opposed free end of said extension member being receivable therein.

15. A pipe support system as recited in claim 14 wherein said clamp comprises two semi-cylindrical sections connected together.

16. A pipe support for securing pipes to a structural element, such as a wall, to prevent the movement of the pipes relative to said structural element, said pipe support system comprising:
a cylindrical pipe, with a portion of its outer surface including a locking configuration, said locking configuration including at least one axial engaging means and at least one circumferential engaging means;
a cylindrical clamp having an inside diameter substantially corresponding to the outside diameter of said pipe and having an inner surface including a complimentary locking configuration, said complimentary locking configuration including at least one axial engaging means and at least one circumferential engaging means, said pipe being receivable within said clamp such that each pair of complimentary axial engaging means are aligned and interlocked, and each pair of complimentary circumferential engaging means are aligned and interlocked thereby preventing said pipe from shifting in both the axial and radial directions, with each pair of aligned and interlocked engaging means comprising an upstanding spline and a recessed key; and
means for rigidly connecting said clamp to said structural element whereby said pipe is supported and prevented from moving relative to said structural element.

17. A pipe support for securing pipes and like conduits to a desired structural member without requiring any welding directly between a pipe segment and the pipe support, comprising:
a clamp member adapted to grasp an outer surface portion of the pipe segment to be secured to the structural member, said clamp member having an interior surface portion corresponding to the outer surface portion of said pipe segment and including engaging means adapted to restrain the pipe segments against movement in a direction parallel to its longitudinal axis and in a circumferential direction about the longitudinal axis of the pipe axis;
complimentary interlocking means formed on the outer surface of the pipe segment, said complimentary interlocking means being adapted to align and interlock with said engaging means for securing the pipe segments to said clamp member substantially without requiring any welding between the pipe member and said clamp member; and
coupling means for coupling said clamp member to the desired structural member, such that the pipe segment is rigidly supported from the structural member substantially without any movement and without any welding required between the pipe segment and said clamp member.

18. A pipe support according to claim 17, wherein said engaging means and said complimentary interlocking means include at least one pair of upstanding spline members extending generally perpendicular to each other and at least one pair of recessed key members adapted to lockably receive said spline members.

19. A pipe support according to claim 18, wherein said key members are formed in a thickened wall portion of the pipe segment, such that the structural integrity of the pipe segment is no diminished by said key members.

20. A pipe support according to claim 17, wherein said clamp member comprises two generally semi-cylindrical sections secured together around the pipe segment, and which further includes securing means for securing said semi-cylindrical sections together around the pipe segment to affix said clamp member to the pipe segment.

21. A pipe support according to claim 20, wherein said semi-cylindrical sections include cooperating flanges for securing said sections together and wherein said securing means includes bolt assemblies for bolting said flanges together.

* * * * *